United States Patent
Shampo

[19]
[11] Patent Number: 5,911,328
[45] Date of Patent: Jun. 15, 1999

[54] MODULAR CHRISTMAS TREE SHAPED CARD AND COMPACT DISC CASE HOLDER

[76] Inventor: Jessie Shampo, 18375 Mesle, Roseville, Mich. 48066

[21] Appl. No.: 09/048,967

[22] Filed: Mar. 26, 1998

[51] Int. Cl.[6] .................................................. A47G 29/00
[52] U.S. Cl. ................................................................ 211/40
[58] Field of Search .............................. 211/40, 45, 189, 211/85, 195; 40/124.4

[56] References Cited

U.S. PATENT DOCUMENTS

| | | | |
|---|---|---|---|
| 3,599,360 | 8/1971 | Lappo | 40/124.4 |
| 3,987,566 | 10/1976 | March | 40/124.4 |
| 4,186,503 | 2/1980 | Fontana | 40/124.4 |
| 4,315,376 | 2/1982 | Eichenauer | 40/124.4 |
| 4,993,560 | 2/1991 | Jaffe | 211/45 |
| 5,242,062 | 9/1993 | Engravalle | 211/45 |

*Primary Examiner*—Alvin Chin-Shue
*Assistant Examiner*—Sarah Purol
*Attorney, Agent, or Firm*—Joseph N. Breaux

[57] ABSTRACT

A modular Christmas tree shaped card and compact disc case holder having a first triangularly shaped member and a second triangularly shaped member which are interconnected to create four sidewalls. The outer vertically tapering surfaces of the first and second triangularly shaped member have formed therein a plurality of limbs wherein an elongated recess is formed between every two adjacent limbs. Each recess has fixedly coupled to the top and lower surfaces thereof inwardly slanted saw teeth which are made of flexibly resilient material, such as, without limitation, flexible plastic or rubber, and which serve to flexibly friction fit couple within the recess, alternately, a card and compact disc case.

20 Claims, 2 Drawing Sheets

MODULAR CHRISTMAS TREE SHAPED CARD AND COMPACT DISC CASE HOLDER

TECHNICAL FIELD

The present invention relates to Christmas tree card holders and, more particularly, to a modular Christmas tree shaped card and compact disc case holder having a first triangularly shaped member and a second triangularly shaped member which are interconnected to create four sidewalls. The outer vertically tapering surfaces of the first and second triangularly shaped member have formed therein a plurality of limbs wherein an elongated recess is formed between every two adjacent limbs. Each recess has fixedly coupled to the top and lower surfaces thereof inwardly slanted saw teeth which are made of flexibly resilient material, such as, without limitation, flexible plastic or rubber, and which serve to flexibly friction fit couple within the recess, alternately, a card and CD case.

BACKGROUND OF THE INVENTION

In most homes, during the Christmas holiday, received Christmas cards are readily displayed in some manner. The religious or other joyful visual illustrations on the front cover of the card often times adds to the holiday decorations filled within the home. Therefore there have been several attempts to display Christmas cards via stands which resemble a Christmas tree.

Additionally, during the Christmas holidays, compact discs CDs are bought having recorded thereon Christmas holiday music. Therefore, I designed a modular Christmas tree stand which can use be used to hold and display, Christmas cards and CD cases.

Several devices have been patented which are aimed at card holders some of which are Christmas tree shaped.

U.S. Pat. No. 5,242,062, by Engravalle, entitled "DISPLAY FOR GREETING CARDS" discloses a device for displaying greeting cards which comprises a flat, relatively thin display member which is secured to a flat surface. The cards are inserted into slots formed in the flat, relatively thin display member.

U.S. Pat. No. 4,993,560, to Jaffe, entitled "CARD HOLDER" discloses a shaped card holder having a plurality of slots and adjacent protrusions formed therein to hold a plurality of card. The card holder may have a shape of a symbol of a holiday, such as a Christmas tree.

U.S. Pat. No. 4,315,376, to Eichenauer, entitled "DISPLAY DEVICE FOR GREETING CARDS" discloses a display device for greeting cards, such as a Christmas cards, having a plurality of structural interrelated sheets of relatively rigid sheet material, such as paperboard or the like. Each of the sheets device a number of card support slots at the outer portion thereof which are each adapted to receive a single greeting card. The slots are vertically aligned so that the cards are supported vertically upright therein.

U.S. Pat. No. 4,186,503, to Fontana, entitled "GREETING CARD DISPLAY ASSEMBLY AND METHOD" discloses a greeting card display having a stack of straight slats to simulate a Christmas tree in both two dimensions and three dimensions and at the same time supports the greeting cards for display. The cards are supported between any two adjacent two slats.

U.S. Pat. No. 3,987,566, to March, entitled "CARD DISPLAY DEVICE" discloses a self-supporting one-piece collapsible device for holding greeting cards. The device is pyramidal in shape having formed therein a plurality of slots for receiving therein Christmas cards.

U.S. Pat. No. 3,599,360, to Lappo, entitled "GREETING CARD DISPLAY TREE" discloses a greeting card display tree having an upright pole upon which can be mounted several sets of branches or outwardly extending arms having mounting platforms at their outer extremities for mounting a plurality of greeting card in an upright and slightly open position. The radius of the arms decreases from the bottom to the top of the structure to give it a treelike shape.

While each of the above card holders function as desired, none of them disclose a recess which has fixedly coupled to the top and lower surfaces thereof inwardly slanted saw teeth which are made of flexibly resilient material, such as, without, flexible plastic or rubber, and which serve to flexibly friction fit couple within the recess, alternately, a card and CD case.

As will be seen more fully below, the present invention is substantially different in structure, methodology and approach from that of the prior card holders.

SUMMARY OF THE INVENTION

The preferred embodiment of the modular Christmas tree shaped card and compact disc case holder of the present invention solves the aforementioned problems in a straight forward and simple manner. What is provided is a modular Christmas tree shaped card and compact disc case holder having a first triangularly shaped member and a second triangularly shaped member which are interconnected to create four sidewalls. The outer vertically tapering surfaces of the first and second triangularly shaped member have formed therein a plurality of limbs wherein an elongated recess is formed between every two adjacent limbs. Each recess has fixedly coupled to the top and lower surfaces thereof inwardly slanted saw teeth which are made of flexibly resilient material, such as, without limitation, flexible plastic or rubber, and which serve to flexibly friction fit couple within the recess, alternately, a card and CD case holder.

In general, the Christmas tree shaped card and compact disc case holder comprises:

a first triangularly shaped member having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which friction fit couple within said recess, alternately, a card and compact disc case; and, a second triangularly shaped member coupled to said first triangularly shaped member perpendicularly and having first and second outer vertically tapering surfaces have formed longitudinally therealong a plurality of limbs wherein an elongated recess is formed between any two adjacent limbs and wherein said recess has fixedly coupled to a top surface and a lower surface thereof inwardly slanted saw teeth which friction fit couple within said recess, alternately, another card and another compact disc case.

As can be appreciated, the Christmas tree shaped holder of the present invention may function as a card holder only or a compact disc case holder only. Nevertheless, the Christmas tree shaped holder can be used to hold both a card and compact disc case.

In view of the above, an object of the present invention is to provide a modular Christmas tree shaped card and compact disc case holder which is capable of coupling a Christmas card or a CD case holder in the same recess contour.

Another object of the present invention is to provide a modular Christmas tree shaped card and compact disc case holder which includes a plurality of recesses each of which has a plurality of flexibly resilient saw teeth. The plurality of flexibly resilient saw teeth resiliently flex to provide a sufficient friction fit coupling of a Christmas card or a CD case to maintain the Christmas card or CD case within the recess.

A further object of the present invention is to provide such recess with top and bottom sawteeth which are interleaved.

It is a still further object of the present invention to provide a modular Christmas tree shaped card and compact disc case holder which includes a base member coupled to a base surface of the first and second triangularly shaped members to support the first and second triangularly shaped members vertically upright.

It is a still further object of the present invention to provide each outer vertically tapering surface with a first elongated recess having a recess depth of ¾ of an inch, a second elongated recess below the first recess has a recess depth of 1¼ inches, a third recess below the second recess has a recess depth with a 1½ inches, the fourth recess below the third recess has a recess depth 1¾ inches, and the fifth recess below the fourth recess has a recess depth 2½ inches.

It is a still further object of the present invention to provide a modular Christmas tree shaped card and compact disc case holder which is made of a material which has sufficient rigidity to maintains a vertical erect posture, such as, without limitation, plastic.

It is still further object of the present invention to provide a modular Christmas tree shaped card and compact disc case holder which can be used to hold only cards or only CDs without any need to modify the recess height of the recess.

In view of the above objects, it is a feature of the present invention to provide a modular Christmas tree shaped card and compact disc case holder which is simple to manufacture.

Another feature of the present invention is to provide a modular Christmas tree shaped card and compact disc case holder which is relatively simple structurally.

A further feature of the present invention is to provide a modular Christmas tree shaped card and compact disc case holder which is easy to use.

It is a still further feature of the present invention to provide a modular Christmas tree shaped card and compact disc case holder which essentially resembles a Christmas tree.

The above and other objects and features of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 1:
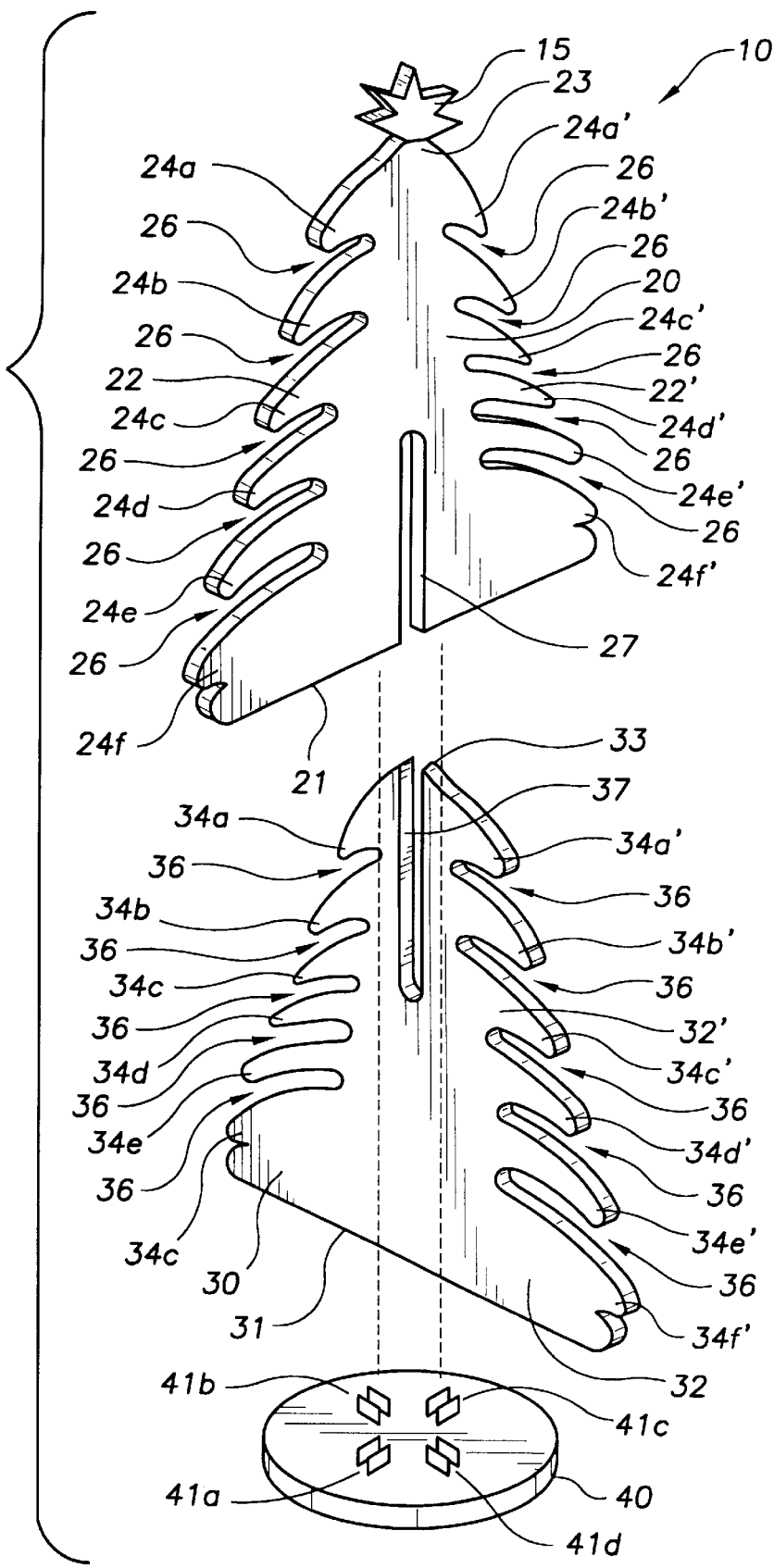
FIG. 1 illustrates an exploded perspective view of the preferred embodiment of the modular Christmas tree shaped card and compact disc case holder of the present invention.
Figure 3:
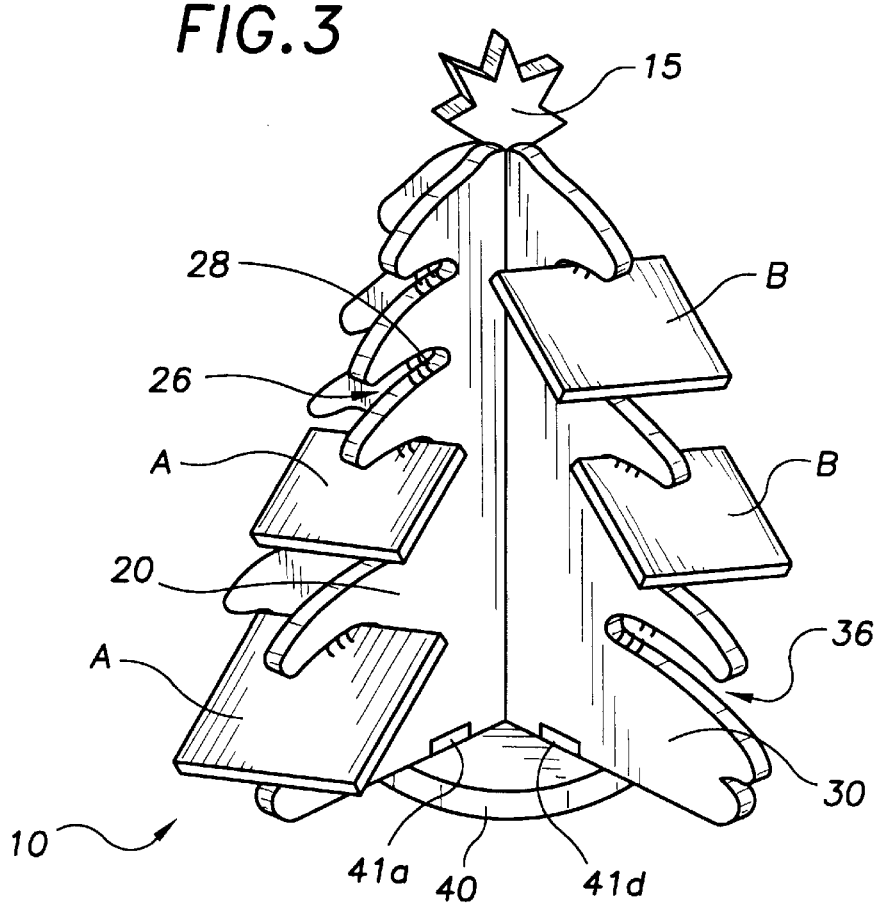
FIG. 3 illustrates an assembled perspective view of the modular Christmas tree shaped card and compact disc case holder of the embodiment of FIG. 1.

Referring now to the drawings, and in particular FIGS. 1 and 3, the modular Christmas tree shaped card and compact disc case holder of the present invention is designated generally by the numeral 10. Modular Christmas tree shaped card and compact disc case holder 10 is comprised of first triangularly shaped member 20, second triangularly shaped member 30, star 15, and base member 40.

First triangularly shaped member 20 has an essentially triangularly shaped profile defined by base surface 21 and first and second outer vertically tapering surfaces 22 and 22' which taper upward. First and second outer vertically tapering surfaces 22 and 22' are essentially symmetrical about a center line connecting apex 23 to the center of base surface 21. Each of the first and second outer vertically tapering surfaces 22 and 22' has formed therein a first plurality of limbs 24a, 24b, 24c, 24d, 24e and 24f stacked in spaced relation vertically along the first outer vertically tapering surface 22 and a second plurality of limbs 24a', 24b', 24c', 24d' 24e' and 24f' stacked in spaced relation vertically along the second outer vertically tapering surface 22'. An elongated recess 26 is formed between every two adjacent vertically stacked limbs of said first plurality of limbs and between any two adjacent vertically stacked limbs of said second plurality of limbs. In the preferred embodiment, there are five recesses 26. Nevertheless, any number of recesses 26 may be provided.

First triangularly shaped member 20 further comprises an elongated slot 27 vertically extending upward a predetermined distance from the center of base surface 21. As shown, the elongated slot 27 does not extend to apex 23.

Star 15 is coupled to apex 23 of first triangularly shaped member 20.

Second triangularly shaped member 30 has an essentially triangularly shaped profile defined by base surface 31 and first and second outer vertically tapering surfaces 32 and 32' which taper upward. First and second outer vertically tapering surfaces 32 and 32' are essentially symmetrical about a center line connecting apex 33 to the center of base surface 31. Each of the first and second outer vertically tapering surfaces 32 and 32' has formed therein a first plurality of limbs 34a, 34b, 34c, 34d, 34e, and 34f stacked in spaced relation vertically along the first outer vertically tapering surface 32 and a second plurality of limbs 34a', 34b', 34c', 34d', 34e' and 34f' stacked in spaced relation vertically along the second outer vertically tapering surface 32'. An elongated recess 36 is formed between any two adjacent vertically stacked limbs of said first plurality of limbs and between any two adjacent vertically stacked limbs of said second plurality of limbs. Nevertheless, any number of recess may be provided.

Second triangularly shaped member 20 further comprises an elongated slot 37 vertically extending downward a predetermined distance from the center of apex 33. As shown in FIG. 1, the elongated slot 37 does not extend to base surface 31.

First and second triangularly shaped members 20 and 30 are interconnected via elongated slot 27 and elongated slot 37 to create four sidewalls.

Figure 2:
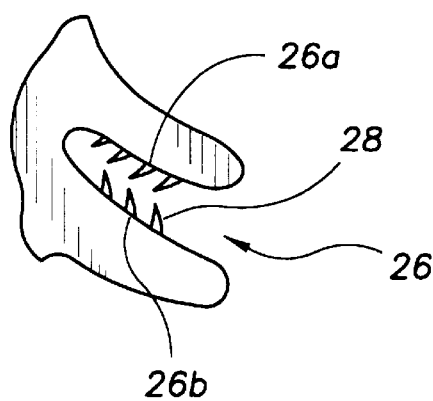
FIG. 2 illustrates a view of a recess.

Referring now to FIG. 2, since each of the recesses 26 and 36 of first and second triangularly shaped members 20 and 30 are essentially identical, only one such recess will be described in detail. Recess 26 has fixedly coupled to top and lower surfaces 26a and 26b thereof a plurality of inwardly slanted saw teeth 28. Each of tooth of the inwardly slanted saw teeth 28 are slanted to the interior of recess 26 and is made of a flexibly resilient material, such as, without limitation, flexible plastic or rubber. The flexibly resilient properties of the flexibly resilient material serve to flexibly friction fit couple within recess 26, alternately, a card A and compact disc case B even though the card A has a significantly thinner profile than the CD case B. Thereby, each recess 26 or 36 can be used to hold only cards or only CDs without any need to modify the recess height of recess 26 or 36.

As can be appreciated, the flexibly resilient properties of the inwardly slanted saw teeth 28 allows the same recess contour to flexibly adapt to hold a Christmas card A or a compact disc DC case B therein. In the preferred embodiment, the recess depth slants downwardly toward the outer perimeter of each limb.

In the preferred embodiment, the lower surface 26b sawteeth are interleaved between the top surface 26a saw teeth.

Figure 4:
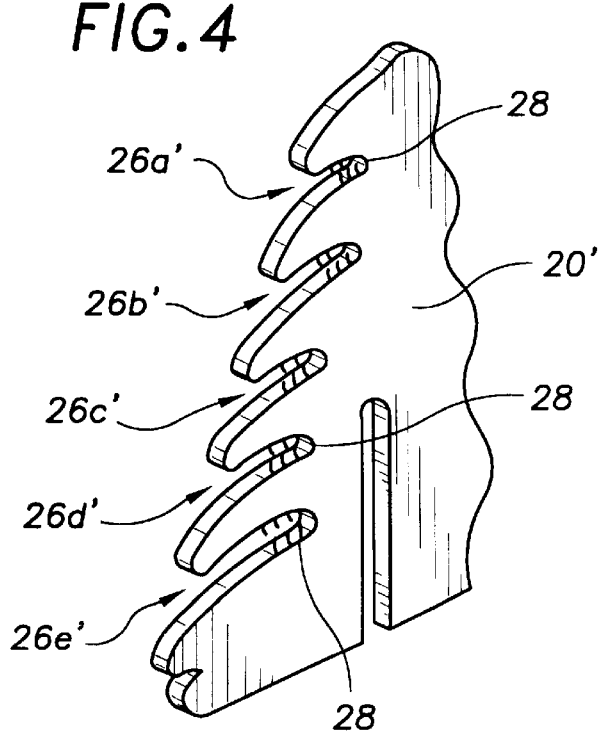
FIG. 4 illustrates a partial view of an alternate embodiment of first triangularly shaped member depicting the recesses of the present invention with varying recess depths.

Referring now to FIG. 4, a partial view of an alternate embodiment of first triangularly shaped member 20' depicting the recesses of the present invention with varying recess depths is shown. Since first triangularly shaped member 20' and the second triangularly shaped member are essentially identical expect for the differences described above in relation to the embodiment of FIG. 1, only the recess of first triangularly shaped member 20' will be described.

First elongated recess 26a' has a recess depth of ¾ of an inch, second elongated recess 26b' below first recess 26a' has a recess depth of 1¼ inches, third recess 26c' below second recess 26b' has a recess depth of 1½ inches, fourth recess 26d' below third recess 26c' has a recess depth of 1¾ inches, and fifth recess 26e' below fourth recess 26d' has a recess depth of 2½ inches.

Referring again to FIG. 1, base member 40 as shown is disc shaped. Nevertheless, base member 40 may have another geometrical profile, such as, without limitation, a square or a triangular shape. Base member comprises four channels 41a, 41b, 41c and 41d which radially project from the center axis of base member 40. Each of the four channels are spaced 90 degrees from the other. As shown, channels 41a and 41c are offset by 180 degrees and receives therein base surface 21 of first triangularly shaped member 20. Channels 41b and 41d are offset by 180 degrees and receive therein base surface 31 of second triangularly shaped member 30.

As can be appreciated, the four channels 41a, 41b, 41c, and 41d serve to support first and second triangularly shaped members 20 and 30 in a vertically upright position.

Modular Christmas tree shaped card and compact disc case holder 10 is made of a material which has sufficient rigidity to maintains a vertical erect posture, such as, without limitation, plastic. First and second triangularly shaped members 20 and 30 when interconnected via slots 27 and 37 resemble a Christmas tree.

It is noted that the embodiment of the modular Christmas tree card and compact disc holder described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Christmas tree shaped card holder comprising:
   a first triangularly shaped member having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which friction fit couple within said recess a card; and,
   a second triangularly shaped member coupled to said first triangularly shaped member perpendicularly and having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which friction fit couple within said recess another card.

2. The card holder of claim 1, wherein said inwardly slanted saw teeth of said recess of said first triangularly shaped member and said inwardly slanted saw teeth of said recess of said second triangularly shaped member is made of flexibly resilient material.

3. The card holder of claim 1, wherein said first and second triangularly shaped members are made of a material which has sufficient rigidity to maintains a vertical erect posture.

4. The card holder of claim 1, wherein each of said outer vertically tapering surfaces of said first triangularly shaped member and each of said outer vertically tapering surfaces of said second triangularly shaped member have five elongated recesses wherein a first elongated recess has a recess depth of ¾ of an inch, a second elongated recess below said first recess has a recess depth of 1¼ inches, a third recess below said second recess has a recess depth with a 1½ inches, a fourth recess below said third recess has a recess depth 1¾ inches, and a fifth recess below said fourth recess has a recess depth 2½ inches.

5. The card holder of claim 1, further comprising a base member comprising:
   a first pair of channels which radially project from a center axis of said base member wherein each of channel of the first pair of channels are spaced 180 degrees with respect to each other wherein said first pair receive a base surface of said first triangularly shaped member to support said first triangularly shaped member in a vertically upright position; and
   a second pair of channels which radially project from a center axis of said base member wherein each of channel of the second pair of channels are spaced 180 degrees with respect to each other wherein said second pair receive a base surface of said second triangularly shaped member to support said second triangularly shaped member in the vertically upright position.

6. The card holder of claim 1, wherein said first triangularly shaped member has an apex, a base surface and has a first elongated slot vertically extending upward a predetermined distance from a center of said base surface; wherein said second triangularly shaped member has a apex and has a second elongated slot vertically extending upward a predetermined distance along a center of said second triangularly shaped member; and wherein said first triangularly shaped member and said second triangularly shaped member are interconnected via said first and second elongated slots.

7. The card holder of claim 1, further comprising a star coupled to an apex of said first triangularly shaped member.

8. A Christmas tree shaped compact disc case holder comprising:
- a first triangularly shaped member having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which friction fit couple within said recess a compact disc case; and,
- a second triangularly shaped member coupled to said first triangularly shaped member perpendicularly and having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which friction fit couple within said recess another compact disc case.

9. The compact disc case holder of claim 8, wherein said inwardly slanted saw teeth of said recess of said first triangularly shaped member and said inwardly slanted saw teeth of said recess of said second triangularly shaped member is made of flexibly resilient material.

10. The compact disc case holder of claim 8, wherein first and second triangularly shaped members are made of a material which has sufficient rigidity to maintains a vertical erect posture.

11. The compact disc case holder of claim 8, wherein each of said outer vertically tapering surfaces of said first triangularly shaped member and each of said outer vertically tapering surfaces of said second triangularly shaped member have five elongated recesses wherein a first elongated recess has a recess depth of ¾ of an inch, a second elongated recess below said first recess has a recess depth of 1¼ inches, a third recess below said second recess has a recess depth with a 1½ inches, a fourth recess below said third recess has a recess depth 1¾ inches, and a fifth recess below said fourth recess has a recess depth 2½ inches.

12. The compact disc case holder of claim 8, further comprising a base member comprising:
- a first pair of channels which radially project from a center axis of said base member wherein each of channel of the first pair of channels are spaced 180 degrees with respect to each other wherein said first pair receive a base surface of said first triangularly shaped member to support said first triangularly shaped member in a vertically upright position; and
- a second pair of channels which radially project from a center axis of said base member wherein each of channel of the second pair of channels are spaced 180 degrees with respect to each other wherein said second pair receive a base surface of said second triangularly shaped member to support said second triangularly shaped member in the vertically upright position.

13. The compact disc case holder of claim 8, wherein said first triangularly shaped member has an apex, a base surface and has a first elongated slot vertically extending upward a predetermined distance from a center of said base surface; wherein said second triangularly shaped member has a apex and has a second elongated slot vertically extending upward a predetermined distance along a center of said second triangularly shaped member; and wherein said first triangularly shaped member and said second triangularly shaped member are interconnected via said first and second elongated slots.

14. The compact disc case holder of claim 8, further comprising a star coupled to an apex of said first triangularly shaped member.

15. A Christmas tree shaped card and compact disc case holder comprising:
- a first triangularly shaped member having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which are made of flexibly resilient material to flexibly friction fit couple within said recess, alternately, a card and a compact disc case; and,
- a second triangularly shaped member coupled to said first triangularly shaped member perpendicularly and having first and second outer vertically tapering surfaces have formed longitudinally therealong a plurality of limbs wherein an elongated recess is formed between every two adjacent limbs and wherein said recess has fixedly coupled to a top surface and a lower surface thereof inwardly slanted saw teeth which are made of flexibly resilient material to flexibly friction fit couple within said recess, alternately, another card and another compact disc case.

16. The card and compact disc case holder of claim 15, wherein said flexibly resilient material is rubber.

17. The card holder and compact disc case of claim 15, wherein said first and second triangularly shaped members are made of a material which has sufficient rigidity to maintains a vertical erect posture.

18. The card and compact disc case holder of claim 15, wherein each of said outer vertically tapering surfaces of said first triangularly shaped member and each of said outer vertically tapering surfaces of said second triangularly shaped member have five elongated recesses wherein a first elongated recess has a recess depth of ¾ of an inch, a second elongated recess below said first recess has a recess depth of 1¼ inches, a third recess below said second recess has a recess depth with a 1½ inches, a fourth recess below said third recess has a recess depth 1¾ inches, and fifth recess below said fourth recess has a recess depth 2½ inches.

19. The card and compact disc case holder of claim 15, further comprising a base member comprising:
- a first pair of channels which radially project from a center axis of said base member wherein each of channel of the first pair of channels are spaced 180 degrees with respect to each other wherein said first pair receive a base surface of said first triangularly shaped member to support said first triangularly shaped member in a vertically upright position; and
- a second pair of channels which radially project from a center axis of said base member wherein each of channel of the second pair of channels are spaced 180 degrees with respect to each other wherein said second pair receive a base surface of said second triangularly shaped member to support said second triangularly shaped member in the vertically upright position.

20. The card and compact disc case holder of claim 15, wherein said first triangularly shaped member has an apex, a base surface and has a first elongated slot vertically extending upward a predetermined distance from a center of said base surface; wherein said second triangularly shaped member has a apex and has a second elongated slot vertically extending upward a predetermined distance along a center of said second triangularly shaped member; and wherein said first triangularly shaped member and said second triangularly shaped member are interconnected via said first and second elongated slots.

* * * * *